March 18, 1969     G. E. HOLCOMB     3,433,431
AUTOMATIC LINE REWINDER
Filed April 12, 1967
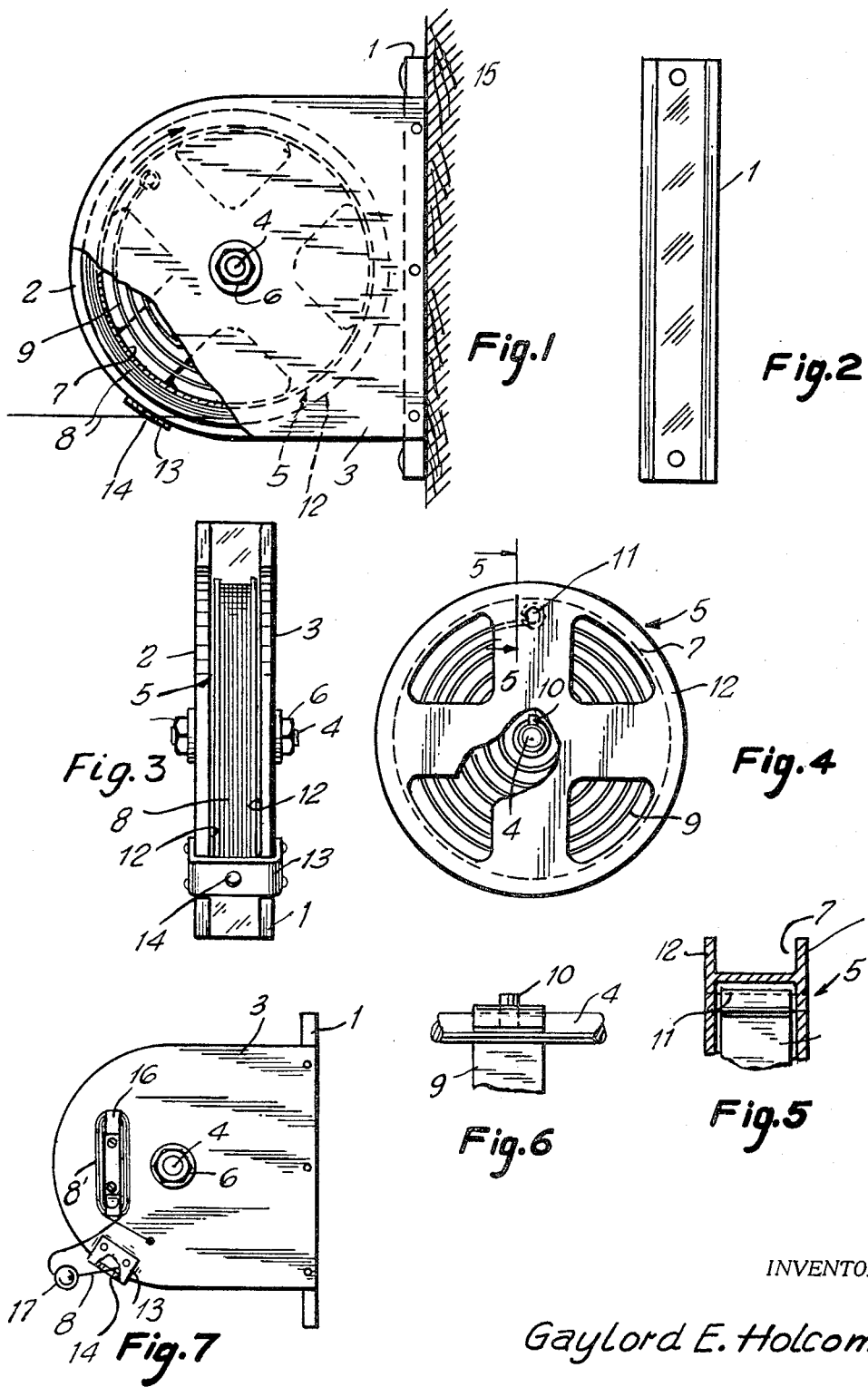
INVENTOR.
Gaylord E. Holcomb United States Patent Office 3,433,431
Patented Mar. 18, 1969

3,433,431
AUTOMATIC LINE REWINDER
Gaylord E. Holcomb, Rte. 1, Shelbyville, Mich. 49344
Filed Apr. 12, 1967, Ser. No. 630,232
U.S. Cl. 242—107                                    1 Claim
Int. Cl. B65h 75/48

ABSTRACT OF THE DISCLOSURE

As an adjunct to the equipment of ice spearing sportsmen, a reel from which the line attached to a spear will unwind when the spear is thrown and automatically rewind when the spear is retrieved. The spring rewind reel is adapted to have a portion of a line wound thereon, ball and strap means prevent the line from being fully rewound on the reel, and a cleat mounted on the reel support removably receives the terminal end of the line.

---

The present invention, while relating to fishing reels and analogous wind up devices in general, has for its main object the provision of an automatically operable line rewinder comprising a reel of particular value and adaptability to ice spearing sportsmen.

Another object of the invention is to provide a reel of the character and for the purpose described which, when a line has been let out as a spear is thrown, will automatically rewind the line as the spear is retrieved and preparation made for the next throw. In other words the object is to eliminate entanglement of the line.

Another object of the invention is to provide a reel for use by fishermen, when spearing through ice, which may be mounted upon a fixed support. A convenient place for mounting the reel is the wall of a shanty often used by fishermen on the ice for protection from the elements. It will thus be observed that the reel is not held by hand as is the case when carried on the butt end of a fishing rod.

And, a still further object of the invention is the provision of a reel, which I term a line rewinder, that is of simple but rugged construction and a novelty in the type of fishing for which it is especially intended.

Other objects and advantages of the invention will become apparent from a consideration of the following detailed description taken in connection with the accompanying drawing whereby a satisfactory embodiment of the invention is shown. However, it is to be understood that the invention is not limited to the details disclosed but includes all such variations and modifications as fall within the spirit of the invention and scope of the appended claim.

In the drawing:

FIGURE 1 is a view of the invention in side elevation, a fragmentary portion of the framework being broken away to illustrate structural details. In this view the invention is shown mounted upon the wall of a structure not otherwise disclosed.

FIGURE 2 is a plan view of the base member of the framework.

FIGURE 3 is a view of the invention as seen from the left of FIGURE 1.

FIGURE 4 is a detail showing in face view the reel and coiled spring contained therein, a fragment of one side of the reel being broken away;

FIGURE 5 is a sectional detail taken on line 5—5 of FIGURE 4;

FIGURE 6 is a detail showing a portion of the axle and the means whereby the inner end of the winding spring is anchored thereto;

FIGURE 7 is a view similar to FIGURE 1 but drawn to a smaller scale and including a bracket on which a spare line may be wound.

In the drawing like reference numerals refer to similar parts throughout the several views.

The framework of the device comprises an elongated rectangular strip 1 of flat stock providing a base to the marginal side edges of which are mortised, or otherwise suitably attached, a pair of spaced, parallel side walls 2 and 3 the free ends of which are semi-circular. These parts are preferably made of plywood although any other suitable material may be used.

Axially aligned in the walls 2 and 3 are holes for receiving the ends of a spindle 4 which is suitably keyed to the side walls 2 and 3 to provide a fixed axle on which a reel 5 is freely revoluble. The ends of spindle 4 are, in this instance, threaded to receive clamping nuts 6. The peripheral face of the reel 5 is formed with an outwardly opening annular channel 7 in which a line, indicated at 8, is wound. Housed within the reel 5 is a spirally wound flat steel spring 9, the inner end of this spring 9 is anchored to the fixed axle 4 by means of a pin 10 over which the spring is hooked, see FIGURES 4 and 6, while its outer end, see FIGURES 4 and 5, is anchored around a stud or pin 11 extending between the opposing side faces 12 of the reel 4. Spanning the side walls 2 and 3 of the frame at their rounded ends and fastened thereto is a U-shaped strap 13 in the connecting portion of which is an opening 14 through which the line 8 is guided when being fed to and from the reel 5.

The fixed support upon which the rewinding implement is mounted for use by a person spearing through ice is shown at 15 in FIGURE 1. This supporting member 15 may well be the wall of a make-shift temporary shanty erected as a protection against the elements, the rewinder being placed at any desired level above the ice or ground surface.

As a spear attached to the line 8, but not shown in the drawing, is thrown the line is let out, unwound, from the reel 5. Then, when the spear has been retrieved, and preparation made for the next throw, the line will be automatically rewound on the reel due to action of the torsional spring 9 which is at that time under tension.

From the foregoing it will be observed that rewinding of the line is automatic, that the line is guided in such a manner as not to be entangled and that the fisherman's hands are free for manipulation of the spear.

It should be added, however, that a stop member, see FIGURE 7, such as a small lead ball 17 is clamped firmly on the line 8 so as to abut the strap 13 before the rewind spring is completely expended, thus holding under tension the major portion of the line, which at this time has been rewound, and preventing it from becoming loose, jumping off the reel and entangling itself. The loose portion of the line, indicated at 8', from its free end to the stop 17 should be approximately 10 feet. Thus, with a spear attached there is sufficient slack in the line to permit throwing the spear freely and accurately. When not in use and the spear disconnected therefrom, the loose end portion 8' of the line 8 is manually wound on a bracket 16 secured to one of the side walls of the reel supporting frame.

What I claim is:

1. In an implement used in spear fishing through ice, the combination of a frame comprised of a flat base having openings therethrough for receiving securing members for attachment to a support, parallel, spaced apart side walls secured to said base, a cross shaft stationarily secured between said side walls, a reel freely rotatable on said shaft, a flat helical spring secured at one end to said shaft and at its other end to said reel for effecting a return rewind of said reel, a fishing line connected at one end on said reel and wound thereupon, the opposite end of said line extending through an opening in a strip secured between said side walls, the line having a lead ball secured thereto on a portion of said opposite end which abuts said strap when the reel is fully rewound, and the terminal end of said opposite end comprising a loose end removably wound on a cleat having oppositely directed hooks at each opposite end.

References Cited

UNITED STATES PATENTS

| | | | |
|---|---|---|---|
| 342,300 | 5/1886 | Hurd | 242—107 |
| 915,997 | 3/1909 | Narum et al. | 242—107.7 |
| 1,000,045 | 8/1911 | Spicer | 242—107.7 |
| 1,133,189 | 3/1915 | Shannon | 43—19 X |
| 2,505,920 | 5/1950 | Sporkett | 242—107 X |
| 2,934,342 | 4/1960 | Tenney | 242—107 X |
| 2,938,514 | 5/1960 | Berg | 242—85.1 X |
| 3,176,931 | 4/1965 | Hannay | 242—107.7 |
| 3,215,361 | 11/1965 | Jones. | |
| 3,227,454 | 1/1966 | Ellenburg | 43—6 X |

WILLIAM S. BURDEN, *Primary Examiner.*

U.S. Cl. X.R.

43—6